United States Patent
Nishida et al.

(10) Patent No.: US 7,438,991 B2
(45) Date of Patent: *Oct. 21, 2008

(54) NONAQUEOUS ELECTROLYTE SECONDARY CELL AND METHOD FOR CHARGING SAME

(75) Inventors: Nobumichi Nishida, Itano-gun (JP); Hidetoshi Inoue, Itano-gun (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 341 days.

This patent is subject to a terminal disclaimer.

(21) Appl. No.: 11/288,355

(22) Filed: Nov. 29, 2005

(65) Prior Publication Data

US 2006/0115733 A1    Jun. 1, 2006

(30) Foreign Application Priority Data

Nov. 30, 2004    (JP)    ............................. 2004-347187

(51) Int. Cl.
*H01M 4/48*    (2006.01)

(52) U.S. Cl. .............. 429/231.3; 429/231.1; 429/231.8; 429/231.4; 429/223; 429/224; 429/326; 429/329; 429/330; 429/332; 429/342

(58) Field of Classification Search .............. 429/231.3, 429/231.1, 231.8, 231.4, 223, 224, 326, 329, 429/330, 332, 342
See application file for complete search history.

(56) References Cited

U.S. PATENT DOCUMENTS 5,686,138 A    11/1997    Fujimoto et al.

2007/0196736 A1*    8/2007    Takahashi et al.    ........ 429/231.3

FOREIGN PATENT DOCUMENTS

| JP | 2002-75448 | A | 3/2002 |
| JP | 2002-313419 | A | 10/2002 |
| JP | 2003-308842 | A | 10/2003 |
| JP | 2004-134366 | A | 4/2004 |
| JP | 2005-317499 | A | 11/2005 |
| WO | WO 2005/093880 | | * 10/2005 |

* cited by examiner

*Primary Examiner*—Laura S Weiner
(74) *Attorney, Agent, or Firm*—Westerman, Hattori, Daniels & Adrian, LLP.

(57) ABSTRACT

The invention provides a non-aqueous electrolyte secondary cell that has high capacity and excels in cycle characteristics. The non-aqueous electrolyte secondary cell functions stably at a high potential of from 4.4 to 4.6 V with respect to lithium and inhibits the decomposition of the electrolytic solution at high potential. This is accomplished as follows. The non-aqueous electrolyte secondary cell has a positive electrode having a positive electrode active material; a negative electrode having a negative electrode active material; and a non-aqueous electrolyte having a non-aqueous solvent and electrolytic salt. The positive electrode active material has: lithium cobalt compound oxide having added therein at least zirconium and magnesium; and lithium-nickel-manganese compound oxide having a layered structure. The positive electrode active material has a potential of from 4.4 to 4.6 V with respect to lithium. The non-aqueous solvent contains diethyl carbonate of 10 vol. % or higher at 25° C.

19 Claims, No Drawings

NONAQUEOUS ELECTROLYTE SECONDARY CELL AND METHOD FOR CHARGING SAME

BACKGROUND OF THE INVENTION

1) Field of the Invention

The present invention relates to an improvement of non-aqueous electrolyte secondary cells, which improvement is intended to improve discharge capacity and cycle characteristics.

2) Description of the Related Art

In recent years, there has been a rapid reduction in the size and weight of mobile information terminals such as mobile phones, notebook personal computers, and PDAs. High capacity and high energy density are required of cells and batteries serving as the driving power sources of such terminals. Non-aqueous electrolyte secondary cells represented by lithium ion secondary cells have high energy density and high capacity and as such are useful as the driving power sources of the mobile information terminals.

As a positive electrode active material of such non-aqueous electrolyte secondary cells, lithium cobalt compound oxide ($LiCoO_2$) is used for its high capacity and excellent charge-discharge characteristics.

As the progress of higher functionality of mobile information terminals, higher capacity is required of the cells. In view of this, such a positive electrode active material is used that is charged to a higher potential than usual in an attempt to increase the use efficiency of the positive electrode active material.

However, if the lithium cobalt compound oxide is charged to a potential higher than 4.3V with respect to lithium, the stability of the compound is significantly reduced, presenting the problem of greatly deteriorating cycle characteristics.

In order to solve this problem, such a technique is proposed that by adding a different metal such as zirconium and magnesium in the lithium cobalt compound oxide, the stability of the compound is increased at high potential.

However, even with this technique, the thermal stability at high potential is not sufficient. In addition, in cells according to this technique, the electrolytic solution is decomposed through charge-discharge cycling, presenting the problem of deteriorating cycle characteristics.

Techniques related to the non-aqueous electrolyte secondary cell are proposed in patent documents 1 to 4, and the outlines are as follows.

Patent Document 1: Japanese Patent Application Publication No. 2002-313419 (paragraphs 0004 to 0007).

Patent Document 2: Japanese Patent Application Publication No. 2002-75448 (paragraphs 0008 to 0029).

Patent Document 3: Japanese Patent Application Publication No. 2003-308842 (claims, paragraphs 0009 to 0012).

Patent Document 4: Japanese Patent Application Publication No. 2004-134366 (paragraphs 0007 to 0009).

(i) Patent document 1 proposes a technique that uses a solvent containing at least, as the solvent components, ethylene carbonate, ethyl methyl carbonate, and diethyl carbonate at a volume ratio of 25 to 40 vol %, 25 to 60 vol %, and 10 to 40 vol %, respectively.

This technique is for the purpose of obtaining a cell that has high capacity, does not suffer swelling caused by gas generation, and has good low-temperature characteristics. However, this technique does not take into consideration the use of the positive electrode active material at high potential, and further improvement is required in this respect.

(ii) Patent document 2 proposes a technique that uses, as the non-aqueous solvent, a mixture solvent of ethylene carbonate and a low-boiling-point solvent excluding dimethoxyethane.

This technique is for the purpose of obtaining a lithium secondary cell that has high cell capacity, has low self-discharge rate, excels in cycle characteristics, and has high charge-discharge efficiency. However, this technique does not take into consideration the use of the positive electrode active material at high potential, and further improvement is required in this respect.

(iii) Patent document 3 proposes the following technique. The positive electrode used here contains, as a positive electrode active material, lithium-manganese-nickel compound oxide that is contained in the positive electrode mixture and generates approximately 5 V with respect to lithium in a fully-charged state. The negative electrode used here uses a negative electrode active material that can intercalate and deintercalate lithium ions during charging and discharging. The non-aqueous electrolytic solution used here is such that lithium salt is dissolved in a solvent that contains ethylene carbonate or propylene carbonate. By immersing such positive electrode and negative electrode in this non-aqueous electrolytic solution, lithium phosphate is contained in the positive electrode mixture.

According to this technique, by having lithium phosphate contained in the positive electrode mixture, the reaction product that results from the reaction of the lithium phosphate and non-aqueous electrolytic solution protects an active portion on the surface of the positive electrode active material. This inhibits the decomposition of the non-aqueous electrolytic solution, making it possible to improve the charge-discharge efficiency. However, with this technique, since lithium-manganese-nickel compound oxide ($LiMn_{2-x}Ni_xO_4$) of spinel structure is used (paragraph 0012), this compound oxide has only 1 mole of the lithium per 2 moles of the manganese and nickel combined. Since the amount of the lithium contributing to the charge-discharge reaction is thus small, high cell capacity cannot be secured sufficiently.

(iv) Patent document 4 proposes the following technique. As the non-aqueous electrolytic solution, such a non-aqueous solvent is used that ethylene carbonate, dimethyl carbonate, and diethyl carbonate meet the formulas y=z, 20<x<30, and x≦2y/3+10, where x, y, and z represent the mixture ratios by volume percent for the ethylene carbonate, dimethyl carbonate, and diethyl carbonate, respectively, with respect to the non-aqueous electrolytic solution.

This technique is for the purpose of obtaining a lithium-ion secondary cell that excels in high-efficiency charge-discharge characteristics at low temperature. However, this technique does not take into consideration the use of the positive electrode active material at high potential.

SUMMARY OF THE INVENTION

In view of the foregoing and other problems, it is an object of the present invention to provide a non-aqueous electrolyte secondary cell that has high capacity and excels in cycle characteristics.

(1) In order to accomplish the above and other objects, a non-aqueous electrolyte secondary cell according to the present invention is configured as follows.

A non-aqueous electrolyte secondary cell comprising: a positive electrode comprising a positive electrode active material; a negative electrode comprising a negative electrode active material; and a non-aqueous electrolyte comprising a non-aqueous solvent and electrolytic salt, wherein: the positive electrode active material comprises: lithium cobalt compound oxide having added therein at least zirconium and magnesium; and lithium-nickel-manganese compound oxide having a layered structure; the positive electrode active material has a potential of from 4.4 to 4.6 V with respect to lithium; and the non-aqueous solvent contains diethyl carbonate of 10 vol. % or higher at 25° C.

With this structure, as the positive electrode active material, lithium cobalt compound oxide in which zirconium (Zr) and magnesium (Mg) are added is used. By addition of zirconium and magnesium, the stability of this compound at high potential (from 4.4 to 4.6 V with respect to lithium) is enhanced. In addition, in the positive electrode active material, lithium-nickel-manganese compound oxide having a layered structure that excels in thermal stability at high potential is added. Thus, thermal stability at high potential is excellent.

The lithium cobalt compound oxide in which zirconium and magnesium are added is represented by the chemical formula $Li_aCo_{1-x-y-z}Zr_xMg_yM_zO_2$ (where M is at least one selected from the group consisting of Al, Ti, and Sn; $0 \leq a \leq 1.1$; and $x+y+z=1$). The layered lithium-nickel-manganese compound oxide is represented by the chemical formula $Li_bMn_sNi_tCo_uX_vO_2$ (where X is at least one selected from the group consisting of Zr, Mg, Al, Ti, and Sn; $0 \leq b \leq 1.1$; and $s+t+u+v=1$). With these compounds, the mole number of the lithium is increased with respect to the total mole number of the other metals than the lithium such as cobalt, nickel, and manganese. Thus, the amount of the lithium contributing to charging and discharging is sufficiently increased, making it possible to obtain high cell capacity.

In addition, with the above structure, the diethyl carbonate contained in the non-aqueous solvent has the effect of inhibiting the decomposition reaction of the non-aqueous electrolyte at high potential. Thus, even when the potential of the positive electrode active material is as high as 4.4 to 4.6 V with respect to lithium, a non-aqueous electrolyte secondary cell excellent in cycle characteristics is realized.

Diethyl carbonate has higher viscosity and lower dielectric constant than other compounds widely used as non-aqueous solvents such as dimethyl carbonate and methylethyl carbonate. Accordingly, if the diethyl carbonate content in the non-aqueous solvent is higher than 30 vol %, it takes a long time to insert the non-aqueous electrolyte into the casing, thereby decreasing productivity. Also, low-temperature characteristics and load characteristics are decreased. In view of the foregoing, the diethyl carbonate content is preferably 30 vol % or lower.

In the above structure, the negative electrode active material may comprise a carbonaceous substance.

Cell voltage is indicated by the difference between the potential of the positive electrode and that of the negative electrode. By increasing the cell voltage, cell capacity can be made high. If a carbonaceous substance with low potential (approximately 0.1 V with respect to lithium) is used as the negative electrode active material, a cell with high cell voltage and high capacity is obtained.

As the carbonaceous substance, natural graphite, artificial graphite, carbon black, coke, glass carbon, carbon fiber, or one baked body of any of the foregoing, or a mixture of a plurality of baked bodies of the foregoing can be used.

In the above structure, the non-aqueous electrolyte may further comprise vinylene carbonate of from 0.5 to 5 mass %

If vinylene carbonate is added in the non-aqueous electrolyte, cycle characteristics are improved. However, if the vinylene carbonate content is excessively low, such an effect cannot be sufficiently obtained. On the other hand, if the vinylene carbonate content is excessively high, a reduction in the initial capacity and swelling of the cell at high temperature are caused. In view of this, the vinylene carbonate content with respect to the total mass of the non-aqueous electrolyte is preferably from 0.5 to 5 mass %, more preferably from 1 to 3 mass %.

In the above structure, the layered lithium-nickel-manganese compound oxide may contain cobalt in the crystal structure of the lithium-nickel-manganese compound oxide.

Containment of cobalt in the crystal structure of the layered lithium-nickel-manganese compound oxide is preferable in that cobalt has the effect of improving discharge characteristics.

In order to sufficiently obtain the advantageous effects of the present invention, the zirconium content is preferably $0.0001 \leq x$ in the chemical formula $Li_aCo_{1-x-y-z}Zr_xMg_yM_zO_2$. Also, in order to sufficiently obtain the advantageous effects of the present invention, the magnesium content is preferably $0.0001 \leq y$. Other than zirconium and magnesium, different element M (at least one selected from the group consisting of Al, Ti, and Sn) can be added. A preferable range for the different element M content is $0.0002 \leq z$. If the total $x+y+z$ of the added metals exceeds 0.03, cell capacity is decreased, which is not preferable.

Also, in order to sufficiently obtain the advantageous effects of the present invention, the nickel content is preferably $0.1 \leq t \leq 0.5$ in the chemical formula $Li_bMn_sNi_tCo_uX_vO_2$. Also, the manganese content is preferably $0.1 \leq s \leq 0.5$.

In order to obtain high thermal stability, the ratio s/t of the nickel to manganese is preferably within the range of from 0.95 to 1.05. In order to further increase the thermal stability of the compound, different element X (at least one selected from the group consisting of Zr, Mg, Al, and Sn) can be added. A preferable range for the different element X content is $0.0001 \leq v \leq 0.03$.

If the content of the lithium cobalt compound oxide in the positive electrode active material is lower than 51 mass %, then cell capacity, cycle characteristics, and preservation characteristics are feared to decrease. If the content of the layered lithium-nickel-manganese compound oxide is lower than 10 mass %, the effect of improving the thermal stability of the positive electrode active material at high potential cannot be sufficiently obtained. In view of this, the mass ratio of the lithium cobalt compound oxide and the layered lithium-nickel-manganese compound oxide is preferably from 51:49 to 90:10, more preferably 70:30 to 80:20.

If the ratio of the negative electrode charge capacity to the positive electrode charge capacity, which is indicated as (negative electrode charge capacity)/(positive electrode charge capacity), is lower than 1.0, because of this excessively low negative electrode charge capacity, the discharge capacity is reduced. In addition, the negative electrode is overcharged and it is feared that the lithium precipitates or deposits on the negative electrode surface. On the other hand, if (negative electrode charge capacity)/(positive electrode charge capacity) is greater than 1.2, there is an increase in irreversible capacity, in which case the discharge capacity is also reduced. In view of this, negative electrode charge capacity/positive electrode charge capacity is preferably from 1.0 to 1.2, more preferably from 1.05 to 1.15, and most preferably 1.1.

(2) In order to accomplish the above and other objects, a method for charging a non-aqueous electrolyte secondary cell according to the present invention is configured as follows.

A method for charging a non-aqueous electrolyte secondary cell comprising a positive electrode comprising a positive electrode active material, a negative electrode comprising a negative electrode active material, and a non-aqueous electrolyte comprising a non-aqueous solvent and electrolytic salt, the method comprising the step of: charging the cell until potential of the positive electrode active material becomes from 4.4 to 4.6 V with respect to lithium, wherein: the positive electrode active material comprises: lithium cobalt compound oxide having added therein at least zirconium and magnesium; and lithium-nickel-manganese compound oxide having a layered structure; and the non-aqueous solvent contains diethyl carbonate of 10 vol. % or higher at 25° C.

By employing the above method, a non-aqueous electrolyte secondary cell that has high capacity and excels in cycle characteristics at high potential is charged.

DESCRIPTION OF THE PREFERRED EMBODIMENTS

Preferred embodiments of the present invention will be described by reference to examples. It should be noted that the present invention will not be limited to the following examples, and that any modifications can be made without departing from the scope of the invention.

EXAMPLE 1

<Preparation of Positive Electrode>

Zirconium (Zr) of 0.2 mole % with respect to cobalt (Co) and magnesium (Mg) of 0.5 mole % with respect to cobalt were coprecipitated and subjected to thermal decomposition reaction, thus obtaining zirconium-and-magnesium containing tricobalt tetraoxide. This tricobalt tetraoxide and lithium carbonate were mixed together, baked in an atmosphere of air at 850° C. for 24 hours, and then ground in a mortar into an average particle diameter of 14 μm, thus obtaining zirconium-and-magnesium containing lithium cobalt compound oxide (positive electrode active material A).

Simultaneously with the above, lithium carbonate and coprecipitated hydroxide represented by $Mn_{0.33}Ni_{0.33}Co_{0.34}(OH)_2$ were mixed together, baked in an atmosphere of air at 1000° C. for 20 hours, and then ground in a mortar into an average particle diameter of 5 μm, thus obtaining cobalt containing lithium-nickel-manganese compound oxide (positive electrode active material B). The crystal structure of this positive electrode active material B was analyzed by using an X-ray, and positive electrode active material B was confirmed to have a layered structure.

The above-described positive electrode active material A and positive electrode active material B were mixed together at a mass ratio of 70:30, thus obtaining a positive electrode active material used in this example. Ninety four parts by mass of this positive electrode active material, 3 parts by mass of carbon powder as a conductive agent, 3 parts by mass of polyvinylidene fluoride (PVdF) as a binder, and N-methyl-pyrrolidone were mixed, thus obtaining a positive electrode active material slurry. This positive electrode active material slurry was applied on both surfaces of a positive electrode current collector (15 μm thick) made of aluminum, dried, and rolled, thus preparing a positive electrode.

<Preparation of Negative Electrode>

Ninety five parts by mass of graphite as a negative electrode active material, 3 parts by mass of carboxy methyl cellulose as a thickening agent, 2 parts by mass of styrene butadiene rubber as a binder, and water were mixed together, thus obtaining negative electrode active material slurry. This negative electrode active material slurry was applied on both surfaces of a negative electrode current collector (8 μm thick) made of copper, dried, and rolled, thus preparing a negative electrode.

The potential of the above graphite is 0.1 V with respect to lithium. The amounts of the active materials to be filled of the positive electrode and the negative electrode were adjusted such that in the potential (4.4 V with respect to lithium in this example, with the voltage being 4.3 V) of the positive electrode active material, which is the standard potential for design, the charge-capacity ratio (negative electrode charge capacity/positive electrode charge capacity) of the positive electrode and the negative electrode was 1.1. The method of calculating the positive electrode charge capacity and the negative electrode charge capacity will be described later.

<Preparation of Electrode Assembly>

An electrode assembly was prepared by winding the positive electrode and the negative electrode with in between a separator made of a microporous film of polypropylene.

<Preparation of Electrolytic Solution>

As a non-aqueous solvent, ethylene carbonate (EC), diethyl carbonate (DEC), and methyl ethyl carbonate (MEC) were mixed at a volume ratio of 20:30:50 and at an atmospheric pressure of 1 and 25° C. As electrolytic salt, $LiPF_6$ was dissolved in the non-aqueous solvent at 1 M (mole/liter). Thus, an electrolytic solution (non-aqueous electrolyte) was obtained.

<Assembly of the Cell>

After the above electrode assembly was inserted in an outer casing, the above electrolytic solution was inserted, and the opening portion of the outer casing was sealed. Thus, a non-aqueous electrolyte secondary cell (34 mm wide×43 mm high×5 mm thick) according to example 1 was prepared.

EXAMPLE 2

A non-aqueous electrolyte secondary cell according to example 2 was prepared in the same manner as in example 1 except that the potential of the positive electrode active material, which was the standard potential for design, was changed to 4.5 V with respect to lithium, and the amounts of the active materials to be filled of the positive electrode and the negative electrode were adjusted such that the charge-capacity ratio of the positive electrode and the negative electrode was 1.1.

EXAMPLE 3

A non-aqueous electrolyte secondary cell according to example 3 was prepared in the same manner as in example 1 except that the potential of the positive electrode active material, which was the standard potential for design, was changed to 4.6 V with respect to lithium, and the amounts of the active materials to be filled of the positive electrode and the negative electrode were adjusted such that the charge-capacity ratio of the positive electrode and the negative electrode was 1.1.

EXAMPLE 4

A non-aqueous electrolyte secondary cell according to example 4 was prepared in the same manner as in example 2 except that EC, DEC, and MEC were mixed at a volume ratio of 20:10:70.

EXAMPLE 5

A non-aqueous electrolyte secondary cell according to example 5 was prepared in the same manner as in example 2 except that EC, DEC, and MEC were mixed at a volume ratio of 20:20:60.

EXAMPLE 6

A non-aqueous electrolyte secondary cell according to example 6 was prepared in the same manner as in example 2 except that EC, DEC, and MEC were mixed at a volume ratio of 20:35:45.

EXAMPLE 7

A non-aqueous electrolyte secondary cell according to example 7 was prepared in the same manner as in example 2 except that EC, DEC, and MEC were mixed at a volume ratio of 20:40:40.

COMPARATIVE EXAMPLE 1

A non-aqueous electrolyte secondary cell according to comparative example 1 was prepared in the same manner as in example 2 except that EC, DEC, and MEC were mixed at a volume ratio of 20:0:80.

COMPARATIVE EXAMPLE 2

A non-aqueous electrolyte secondary cell according to comparative example 2 was prepared in the same manner as in example 2 except that EC, DEC, and MEC were mixed at a volume ratio of 20:5:75.

COMPARATIVE EXAMPLE 3

A non-aqueous electrolyte secondary cell according to comparative example 3 was prepared in the same manner as in example 1 except that the potential of the positive electrode active material, which was the standard potential for design, was changed to 4.3 V with respect to lithium, and the amounts of the active materials to be filled of the positive electrode and the negative electrode were adjusted such that the charge-capacity ratio of the positive electrode and the negative electrode was 1.1.

COMPARATIVE EXAMPLE 4

A non-aqueous electrolyte secondary cell according to comparative example 4 was prepared in the same manner as in example 1 except that the potential of the positive electrode active material, which was the standard potential for design, was changed to 4.7 V with respect to lithium, and the amounts of the active materials to be filled of the positive electrode and the negative electrode were adjusted such that the charge-capacity ratio of the positive electrode and the negative electrode was 1.1.

(The Relationship Between Potential and Charge Capacity Per 1 g of Positive Electrode Active Material)

A three-electrode cell (the opposite electrode: lithium metal, the reference electrode: lithium metal) that used the positive electrode prepared in example 1 was prepared, and the positive electrode charge capacity per 1 g of the active material at each charge potential was measured at 25° C. The results are shown in Table 1.

TABLE 1

| Charge positive electrode potential (vsLi/Li$^+$) | Positive electrode charge capacity (mAh/g) |
|---|---|
| 4.3 V | 166 |
| 4.4 V | 182 |
| 4.5 V | 200 |
| 4.6 V | 230 |
| 4.7 V | 240 |

In examples 1 to 7 and comparative example 1 to 4, the positive electrode charge capacity at each standard potential for design was calculated from Table 1, and the negative electrode charge capacity was calculated from the theoretical capacity of graphite.

(Tests for Cell Characteristics)

Each of the above-described cells was subjected to tests for cell characteristics. The results are shown in Table 2.

<Cycle Characteristics Test>

Charge conditions: a constant current of 1 I t (the value obtained by cell capacity/1 hour); constant voltage (the cell voltage of each cell); 3 hours in total; and 25° C.

Discharge conditions: a constant current of 1 I t; an ending voltage of 3.0 V; and 25° C.

Cycle characteristics (%): (300-cycle discharge capacity/1-cycle discharge capacity)×100.

<Load Characteristics Test>

Load discharge conditions: a constant current of 2.5 I t (the value obtained by cell capacity/1 hour×2.5); an ending voltage of 3.0 V; and 25° C.

Load characteristics (%): (Load discharge capacity/1 I t discharge capacity)×100.

<Low-Temperature Characteristics Test>

Low-temperature discharge conditions: a constant current of 1 I t (the value obtained by cell capacity/1 hour); an ending voltage of 3.0 V; and −20° C.

Low-temperature characteristics (%): (Low-temperature discharge capacity/25° C. discharge capacity)×100.

The cell capacity was assumed the discharge capacity of the first cycle of the above cycle characteristics test.

TABLE 2

| | Cell Voltage | Positive Electrode Potential (vsLi/Li$^+$) | Mixture Ratio by Volume of Non-aqueous Solvent (EC:DEC:MEC) | Cell Capacity (mAh) | Cycle Characteristics (%) | Load Characteristics (%) | Low-Temperature Characteristics (%) |
|---|---|---|---|---|---|---|---|
| Ex. 1 | 4.3 V | 4.4 V | 20:30:50 | 820 | 90 | 83 | 31 |
| Ex. 2 | 4.4 V | 4.5 V | 20:30:50 | 850 | 88 | 81 | 30 |
| Ex. 3 | 4.5 V | 4.6 V | 20:30:50 | 910 | 86 | 82 | 32 |
| Ex. 4 | 4.4 V | 4.5 V | 20:10:70 | 850 | 87 | 82 | 32 |
| Ex. 5 | 4.4 V | 4.5 V | 20:20:60 | 850 | 88 | 82 | 32 |

TABLE 2-continued

|  | Cell Voltage | Positive Electrode Potential (vsLi/Li+) | Mixture Ratio by Volume of Non-aqueous Solvent (EC:DEC:MEC) | Cell Capacity (mAh) | Cycle Characteristics (%) | Load Characteristics (%) | Low-Temperature Characteristics (%) |
|---|---|---|---|---|---|---|---|
| Ex. 6 | 4.4 V | 4.5 V | 20:35:45 | 850 | 87 | 77 | 24 |
| Ex. 7 | 4.4 V | 4.5 V | 20:40:40 | 850 | 87 | 76 | 23 |
| Com. Ex. 1 | 4.4 V | 4.5 V | 20:0:80 | 850 | 50 | 83 | 34 |
| Com. Ex. 2 | 4.4 V | 4.5 V | 20:5:75 | 850 | 59 | 83 | 34 |
| Com. Ex. 3 | 4.2 V | 4.3 V | 20:30:50 | 770 | 90 | 82 | 32 |
| Com. Ex. 4 | 4.6 V | 4.7 V | 20:30:50 | 920 | 60 | 83 | 34 |

From Table 2 above, it can be seen that in examples 1 to 3, where the cell voltages were from 4.3 to 4.5 V, the cell capacities were from 820 to 910 mAh, which were 50 to 140 mAh greater than 770 mAh for comparative example 3, where the cell voltage was 4.2 V.

This can be considered as follows. In examples 1 to 3, the positive electrode was charged to a potential higher than in comparative example 3. This increased the use efficiency of the positive electrode active material, resulting in increased cell capacity.

It can also be seen that in comparative example 4, where the cell voltage was 4.6 V, cycle characteristics were 60%, which was a significant deterioration compared with 86 to 90% for examples 1 to 3, where the cell voltages were from 4.3 to 4.5 V.

This can be considered as follows. When the cell voltage was as high as 4.6 V (the potential of the positive electrode active material being 4.7 V with respect to lithium), even the positive electrode active material of the present invention decreased its stability as a compound and deteriorated through charge-discharge cycling, resulting in increased deterioration of cycle characteristics. On the other hand, when the cell voltage was in the range of from 4.3 to 4.5 V, the positive electrode active material did not deteriorate. Each cell was disassembled after the cycle characteristics test. In examples 1 to 3, no deterioration of the positive electrode active material was observed, whereas in comparative example 4 the positive electrode active material was observed to have significantly deteriorated. This confirms the above speculation.

It can also be seen that in comparative example 1, where diethyl carbonate (DEC) was not contained, and in comparative example 2, where the diethyl carbonate content was 5 vol %, cycle characteristics were 50% and 59%, which were significant deteriorations compared with 87% and 88% for examples 2, 4 to 7, where the diethyl carbonate content was from 10 to 40 vol %.

This can be considered as follows. When the diethyl carbonate content was lower than 10 vol %, because of this excessively low diethyl carbonate content, it was not possible to inhibit the decomposition reaction of the electrolytic solution, resulting in increased deterioration of cycle characteristics. On the other hand, when the diethyl carbonate content was 10 vol % or higher, the diethyl carbonate sufficiently inhibited the decomposition reaction of the electrolytic solution, resulting in no deterioration of cycle characteristics. Each cell was disassembled after the cycle characteristics test. In examples 2, 4 to 7, no deterioration of the electrolytic solution was observed, whereas in comparative examples 1 and 2 the electrolytic solution was observed to have deteriorated. This confirms the above speculation.

It can also be seen that in examples 6 and 7, where the diethyl carbonate content was 35 vol % or higher, load characteristics were 76 to 77% and low-temperature characteristics were 23 to 24%, which were deteriorations compared with 81 to 82% and 30 to 32%, respectively, for examples 2, 4, and 5, where the diethyl carbonate content was from 10 to 30 vol %.

This can be considered as follows. Since diethyl carbonate (DEC) has higher viscosity and lower dielectric constant than methyl ethyl carbonate (MEC), load-characteristics and low-temperature characteristics deteriorate as the increase of the diethyl carbonate content. This phenomenon becomes notable when the diethyl carbonate content becomes higher than 30 vol %.

(Supplementary Remarks)

In the present invention, the shape of the cell is not limited; other than the square-shaped outer casing used in the above examples, a cylindrical outer casing, coin-shaped outer casing, laminate outer casing, and the like can be used.

Also, as the non-aqueous solvent, other than diethyl carbonate (DEC), ethylene carbonate (EC), and methyl ethyl carbonate (MEC), which are used in the above examples, other non-aqueous solvents known in the art can be used such as propylene carbonate, γ-butyrolactone, dimethyl carbonate, tetrahydrofuran, 1,2-dimethoxy ethane, 1,3-dioxolane, 2-methoxytetrahydrofuran, and diethyl ether.

Also, as the electrolytic salt, other than $LPF_6$, which is used in the above examples, one of the known lithium salts such as $LiN(C_2F_5SO_2)_2$, $LiN(CF_3SO_2)_2$, $LiClO_4$, and $LiBF_4$, or a mixture of a plurality of the foregoing can be used.

What is claimed is:

1. A non-aqueous electrolyte secondary cell comprising:
   a positive electrode comprising a positive electrode active material;
   a negative electrode comprising a negative electrode active material; and
   a non-aqueous electrolyte comprising a non-aqueous solvent and electrolytic salt, wherein:
   the positive electrode active material comprises: lithium cobalt compound oxide having added therein at least zirconium and magnesium; and lithium-nickel-manganese compound oxide having a layered structure;
   the positive electrode active material has a potential of from 4.4 to 4.6 V with respect to lithium; and
   the non-aqueous solvent contains diethyl carbonate of 10 vol. % or higher and 30 vol. % or lower at 25° C.

2. A non-aqueous electrolyte secondary cell according to claim 1, wherein the non-aqueous electrolyte further comprises vinylene carbonate of from 0.5 to 5 mass %.

3. The non-aqueous electrolyte secondary cell according to claim 2, wherein the negative electrode active material comprises a carbonaceous substance.

4. The non-aqueous electrolyte secondary cell according to claim 2, wherein the layered lithium-nickel-manganese compound oxide contains cobalt in a crystal structure of the layered lithium-nickel-manganese compound oxide.

5. The non-aqueous electrolyte secondary cell according to claim 2, wherein the mole number of the zirconium contained in the lithium cobalt compound oxide is 0.0001 or greater, and the mole number of the magnesium contained in the lithium cobalt compound oxide is 0.0001 or greater, when the total mole number of all the metal elements excluding the lithium in the lithium cobalt compound oxide is assumed to be 1.

6. The non-aqueous electrolyte secondary cell according to claim 2, wherein the mole number of the nickel in the layered lithium-nickel-manganese compound oxide is from 0.1 to 0.5, and the mole number of the manganese in the layered lithium-nickel-manganese compound oxide is from 0.1 to 0.5, when the total mole number of all the metal elements excluding the lithium in the lithium-nickel-manganese compound oxide is assumed to be 1.

7. The non-aqueous electrolyte secondary cell according to claim 2, wherein mole mixture ratio (mole number of the manganese)/(mole number of the nickel) in the layered lithium-nickel-manganese compound oxide is in a range of from 0.95 to 1.05.

8. The non-aqueous electrolyte secondary cell according to claim 2, wherein mass mixture ratio of the lithium cobalt compound oxide and the layered lithium-nickel-manganese compound oxide is from 51:49 to 90:10.

9. The non-aqueous electrolyte secondary cell according to claim 2, wherein (negative electrode charge capacity)/(positive electrode charge capacity) is from 1.0 to 1.2.

10. The non-aqueous electrolyte secondary cell according to claim 1, wherein the negative electrode active material comprises a carbonaceous substance.

11. The non-aqueous electrolyte secondary cell according to claim 1, wherein the layered lithium-nickel-manganese compound oxide contains cobalt in a crystal structure of the layered lithium-nickel-manganese compound oxide.

12. The non-aqueous electrolyte secondary cell according to claim 1, wherein the mole number of the zirconium contained in the lithium cobalt compound oxide is 0.0001 or greater, and the mole number of the magnesium contained in the lithium cobalt compound oxide is 0.0001 or greater, when the total mole number of all the metal elements excluding the lithium in the lithium cobalt compound oxide is assumed to be 1.

13. The non-aqueous electrolyte secondary cell according to claim 1, wherein the mole number of the nickel in the layered lithium-nickel-manganese compound oxide is from 0.1 to 0.5, and the mole number of the manganese in the layered lithium-nickel-manganese compound oxide is from 0.1 to 0.5, when the total mole number of all the metal elements excluding the lithium in the lithium-nickel-manganese compound oxide is assumed to be 1.

14. The non-aqueous electrolyte secondary cell according to claim 1, wherein mole mixture ratio (mole number of the manganese)/(mole number of the nickel) in the layered lithium-nickel-manganese compound oxide is in a range of from 0.95 to 1.05.

15. The non-aqueous electrolyte secondary cell according to claim 1, wherein mass mixture ratio of the lithium cobalt compound oxide and the layered lithium-nickel-manganese compound oxide is from 51:49 to 90:10.

16. The non-aqueous electrolyte secondary cell according to claim 15, wherein mass mixture ratio of the lithium cobalt compound oxide and the layered lithium-nickel-manganese compound oxide is from 70:30 to 80:20.

17. The non-aqueous electrolyte secondary cell according to claim 1, wherein (negative electrode charge capacity)/(positive electrode charge capacity) is from 1.0 to 1.2.

18. A method for charging a non-aqueous electrolyte secondary cell comprising a positive electrode comprising a positive electrode active material, a negative electrode comprising a negative electrode active material, and a non-aqueous electrolyte comprising a non-aqueous solvent and electrolytic salt, the method comprising the step of:

charging the cell until potential of the positive electrode active material becomes from 4.4 to 4.6 V with respect to lithium, wherein:

the positive electrode active material comprises: lithium cobalt compound oxide having added therein at least zirconium and magnesium; and lithium-nickel-manganese compound oxide having a layered structure; and the non-aqueous solvent contains diethyl carbonate of 10 vol. % or higher and 30 vol. % or lower at 25° C.

19. The method according to claim 18, wherein (negative electrode charge capacity)/(positive electrode charge capacity) is from 1.0 to 1.2.

* * * * *